(12) United States Patent
Logalbo et al.

(10) Patent No.: US 8,977,310 B2
(45) Date of Patent: Mar. 10, 2015

(54) METHODS FOR COORDINATING WIRELESS COVERAGE BETWEEN DIFFERENT WIRELESS NETWORKS FOR MEMBERS OF A COMMUNICATION GROUP

(75) Inventors: Robert D. Logalbo, Rolling Meadows, IL (US); Jeffrey S. Anderson, Itasca, IL (US); Bradley M. Hiben, Glen Ellyn, IL (US); Daniel J. McDonald, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 820 days.

(21) Appl. No.: 12/982,485

(22) Filed: Dec. 30, 2010

(65) Prior Publication Data

US 2012/0172083 A1    Jul. 5, 2012

(51) Int. Cl.
*H04B 7/00* (2006.01)
*H04W 36/14* (2009.01)
*H04W 8/18* (2009.01)
*H04W 36/04* (2009.01)
(Continued)

(52) U.S. Cl.
CPC .............. *H04W 36/14* (2013.01); *H04W 8/186* (2013.01); *H04W 36/04* (2013.01); *H04W 4/06* (2013.01); *H04W 16/32* (2013.01); *H04W 36/32* (2013.01); *H04W 36/38* (2013.01); *H04W 48/18* (2013.01); *H04W 76/005* (2013.01)
USPC ............ 455/518; 455/519; 455/500; 370/466

(58) Field of Classification Search
USPC ............. 455/518, 519, 552.1, 445, 433, 90.2, 455/450–453, 560, 414.3, 428, 507, 432.1, 455/412.1, 422.1, 426.1, 435.1–435.3, 455/440–444; 370/335, 342, 441, 401, 352, 370/355, 466
See application file for complete search history.

(56) References Cited

U.S. PATENT DOCUMENTS 5,519,884 A * 5/1996 Duque-Anton et al. ...... 455/450
6,490,452 B1   12/2002 Boscovic et al.
(Continued)

FOREIGN PATENT DOCUMENTS

EP          2023674 A1    2/2009
WO    20050104595 A1   11/2005

OTHER PUBLICATIONS

PCT International Search Report and Written Opinion of the International Searching Authority for Application No. PCT/US2011/067691 dated May 7, 2012.

*Primary Examiner* — Sujatha Sharma
(74) *Attorney, Agent, or Firm* — Valerie M. Davis; Steven A. May

(57) ABSTRACT

A method for coordinating wireless coverage between a first wireless network and a second wireless network for a communication device, wherein the communication device performs the method, which includes: detecting wireless coverage by the first wireless network; affiliating to a communication group to become a member of the communication group; receiving, from an infrastructure device coupled to the first wireless network, a set of channels on the second wireless network for the communication group, wherein the set of channels is determined based on the location of members of the communication group; detecting a loss of coverage in the first wireless network of at least one member of the communication group; and, responsive to detecting the loss of coverage, switching to a channel in the set of channels on the second wireless network for communications for the communication group.

12 Claims, 13 Drawing Sheets

(51) Int. Cl.
*H04W 4/06* (2009.01)
*H04W 16/32* (2009.01)
*H04W 36/32* (2009.01)
*H04W 36/38* (2009.01)
*H04W 48/18* (2009.01)
*H04W 76/00* (2009.01)

(56) References Cited

U.S. PATENT DOCUMENTS

| | | |
|---|---|---|
| 6,606,499 B1 * | 8/2003 | Verrier et al. .............. 455/452.1 |
| 6,725,052 B1 | 4/2004 | Raith |
| 7,487,210 B2 | 2/2009 | Ludwig et al. |
| 7,515,915 B2 | 4/2009 | Buckley |
| 7,580,384 B2 | 8/2009 | Kubler et al. |
| 7,587,180 B2 | 9/2009 | Maeda et al. |
| 7,599,685 B2 | 10/2009 | Goldberg et al. |
| 8,208,443 B2 * | 6/2012 | Rangaiah et al. ............. 370/331 |
| 8,315,189 B2 * | 11/2012 | Ekici et al. ..................... 370/255 |
| 8,340,664 B2 * | 12/2012 | Tenny et al. ................ 455/432.1 |
| 2002/0071405 A1 * | 6/2002 | Kelley et al. ................... 370/332 |
| 2005/0014378 A1 | 6/2005 | Wilson |
| 2006/0282554 A1 * | 12/2006 | Jiang et al. ....................... 710/14 |
| 2007/0049324 A1 * | 3/2007 | Sambhwani et al. ......... 455/525 |
| 2007/0275717 A1 * | 11/2007 | Edge et al. ..................... 455/434 |
| 2008/0009291 A1 | 1/2008 | Emberson et al. |
| 2008/0159225 A1 * | 7/2008 | Kim et al. ...................... 370/331 |
| 2010/0069094 A1 * | 3/2010 | Chin et al. ..................... 455/458 |
| 2010/0173630 A1 * | 7/2010 | Han et al. ...................... 455/433 |
| 2010/0184439 A1 * | 7/2010 | Chen et al. .................... 455/436 |
| 2011/0110254 A1 * | 5/2011 | Ji et al. .......................... 370/252 |
| 2011/0250891 A1 * | 10/2011 | Zou et al. ...................... 455/437 |
| 2011/0255509 A1 * | 10/2011 | Huang et al. .................. 370/331 |
| 2011/0263254 A1 * | 10/2011 | Nader ............................ 455/436 |
| 2013/0079020 A1 * | 3/2013 | Shahid et al. ................. 455/444 |

* cited by examiner

METHODS FOR COORDINATING WIRELESS COVERAGE BETWEEN DIFFERENT WIRELESS NETWORKS FOR MEMBERS OF A COMMUNICATION GROUP

TECHNICAL FIELD

The present disclosure relates generally to wireless communication coverage, and in particular to methods for coordinating wireless coverage between different wireless networks for a communication device.

BACKGROUND

Many large cities have large conventional Land Mobile Radio (LMR) communication systems. These conventional communication systems are often narrowband analog wireless communication systems (also interchangeably referred to as analog wireless networks, narrowband wireless networks, narrowband analog wireless networks, and narrowband networks) used for public safety and other purposes. The analog wireless networks operate on a number of frequencies, and provide on-street and typically in-building access to communication devices. These analog wireless networks will continue to operate in many big cities for a number of years.

For a variety of reasons, such as the conventional systems' lack of bandwidth, broadband digital wireless communication systems (also interchangeably referred to as broadband networks, broadband wireless networks, and broadband digital networks) have been or will be installed in many big cities. For example, there are plans to install LTE (Long Term Evolution) wireless networks (also interchangeably referred to as LTE networks) in many big cities for public safety and other purposes. However, the broadband digital networks sometimes fail to provide highly reliable in-building wireless communication coverage. Therefore, a communication device connecting to a broadband network may lose the connection to the broadband network when the device moves into a building or out of range of the broadband network on the street, for instance. The loss of connection interrupts the communication over the broadband network among a group of communication devices.

Accordingly, there is a need for methods that coordinate wireless coverage between the analog wireless networks and broadband wireless networks for communication devices to provide uninterrupted communication for these devices.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
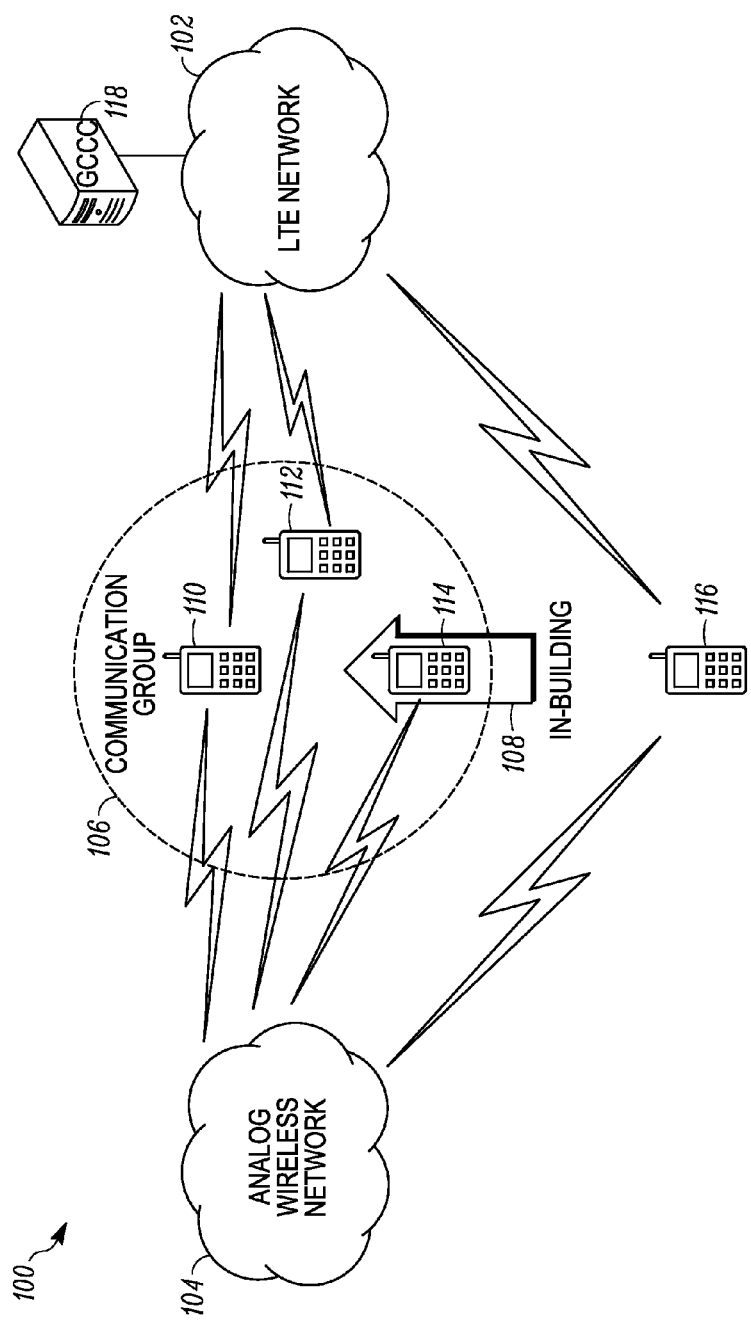
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides methods for coordinating wireless coverage between different wireless networks for a communication device. In accordance with the present teachings, a method performed by a communication device includes detecting wireless coverage by a first wireless network, such as an LTE network, and affiliating to a communication group to become a member of the communication group. The method further includes receiving, from an infrastructure device coupled to the first wireless network, a set of channels on a second wireless network (for example, a conventional narrowband analog wireless network) for the communication group. The infrastructure device coupled to the first wireless network is also interchangeably referred to as a Group Communication Coverage Controller (GCCC). The set of channels is determined based on the location of the members of the communication group. In addition, the method includes detecting a loss of coverage in the first wireless network of at least one member of the communication group, and, in response to detecting the loss of coverage, switching to a channel in the set of channels on the second wireless network for communications for the communication group.

Further in accordance with the present teachings, a method performed by an infrastructure device coupled to a first wireless network includes determining that a first communication device has joined as a member of a communication group; determining a set of channels on a second wireless network for the communication group, wherein the set of channels is determined based on the location of members of the communication group; determining one or more priority channels in the set of channels; and sending the set of channels including the one or more priority channels to the first communication device.

Various embodiments in accordance with the present teachings may have different numbers of priority channels. For example, one embodiment may have one priority channel, while another embodiment may have more than one priority channel. In addition, various embodiments may determine a priority channel differently. For example, in some broadband wireless networks, such as LTE networks, the priority of a channel is determined differently from in narrowband networks, and can be based on various factors including, but not limited to, a level of Quality of Server (QoS) on the network channels. One or more priority channels are selected from a set of channels by comparing different factors depending on the particular network implementation. Moreover, the channels in the set may be "prioritized" such that the channels have an order of priority relative to each other, for example, from one or more highest priority channels to one or more lowest priority channels.

As will be described in more detail below by reference to the figures, a number of users or subscribers often exchange media with each other over a communication network by forming what is defined as and referred to herein as a "communication group." In the communication group, each subscriber uses a communication device to communicate with other members of the communication group. The communication among the communication devices within a communication group is termed herein as group communication. Group communication can be carried out over a variety of networks, such as narrowband analog wireless networks and broadband digital wireless networks.

The information exchanged within the communication group can be voice only, multimedia, data only, data and voice, and the like; wherein, for example, for voice only communications, the communication group is generally referred to as a talkgroup. Moreover, the communication devices used by the subscribers can include one or more applications for delivering and receiving media including, but not limited to, a push-to-talk (PTT) application, a PTX (push-to-anything) application, a video application, a Short Message Service (SMS) application, etc. A user or communication device can affiliate with or to (meaning join using an established procedure) one or more communication groups at any time or at some particular times. Moreover, a user or communication device may deaffiliate from (meaning leave using an established procedure) a communication group at any time or at some particular times.

Oftentimes, it is imperative that the communication group have uninterrupted communication among the members of the group. For example, a communication group of police officers handling a dangerous situation may require uninterrupted connection between the police officers. In implementation scenarios described herein, communication devices affiliated with a communication group are adapted to connect to two wireless networks, for instance using a two-banded radio that has a conventional analog modem to connect to a conventional analog wireless network and an integrated LTE modem to connect to an LTE network. However, the first (e.g., broadband) wireless network used by members of the communication group may not have coverage in some areas or inside some constructions or buildings. Accordingly, one or more communication devices in the communication group may lose its connection to the first wireless network when these communication devices move into a building or out of range on the street. In such a situation, the group communication among the members of the communication group is interrupted.

In accordance with the present teachings, methods are performed to facilitate communication devices in the communication group switching from the first wireless network to a second wireless network, such as a conventional narrowband analog wireless network, that provides in-building coverage, in order to continue the group communication using a set of channels on the second wireless network. This set of channels on the second wireless network and for the group communication is provided to the members of the communication group by an infrastructure device coupled the first wireless network. In determining the set of channels for group communications in the second network, methods are performed to facilitate a balance of traffic load on the channels of the second wireless network. For example, the infrastructure device may select less loaded channels to include within the set of channels for the communication group. When each communication device in the communication group (or some number of communication devices above a threshold) is back within coverage of the first wireless network, the group communications are switched back to the first wireless network.

As used herein, a set means one or more; thus, a set of channels means one or more channels. Location means physical location, and a majority means more than fifty percent. Furthermore, the coverage area of a channel or wireless network means a geographical area within which a communication device can connect to that channel or wireless network. A wireless network usually operates multiple channels, and the multiple channels may have different coverage areas. The term "channel" as used herein refers to a logical channel and is defined as a logical abstraction of a physical channel, wherein the logical channel is characterized by a channel identifier (ID) and a set of operational parameters that depend on the particular radio technology of the wireless network.

For example, the set of operational parameters may include, but is not limited to, one of more of: center frequency; physical channel (which is defined as a physical over-the-air radio frequency (RF) resource associated with a range of radio frequencies on which radio signals travel), such as an analog frequency (in a conventional system) or a control channel (in a trunked system); channel type (such as Analog, Project 25 (P25), Terrestrial Trunked Radio (TETRA), Digital Mobile Radio(DMR)); and the like. Moreover, switching to a channel on the second network means selecting a channel on the second network for the purpose of media transmission for a communication group or for the purpose of scanning a set of channels to identify a transmission from another member of the communication group.

Referring now to the drawings, and in particular FIG. 1, an illustrative communication system implementing embodiments in accordance with the present teachings is shown and indicated generally at 100. System 100 comprises a first wireless network 102 and a second wireless network 104 having overlapping coverage areas and communication devices 110, 112, 114, 116 that communicate using one or both of the networks 102 and 104. Networks 102 and 104 include a numbers of infrastructure devices (not shown) for facilitating communications between the communication devices 110 to 116. Such infrastructure devices may include, but are not limited to, bridges, switches, zone controllers, base station controllers, repeaters, base radios, base stations, base transceiver stations, access points, routers or any other type of infrastructure equipment interfacing a communication device in a wireless environment. The wireless network 102 is further coupled to an infrastructure device 118, such as a media or call server or a media or call controller, which provides communication or media management and control for communication devices and communication groups accessing the wireless network 102. The infrastructure device 118 coupled to the wireless network 102 is also interchangeably referred to herein as a Group Communication Coverage Controller (GCCC).

In this illustrative implementation, wireless network 102 is a broadband network, for example a $3^{rd}$ Generation Partnership Program (3GPP) LTE access network having infrastructure devices whose operation is compliant with a suite of 3GPP Technical Specifications (TSs). Further in accord with this illustrative implementation, wireless network 104 is an analog or digital narrowband wireless network such as a P25 network having infrastructure devices whose operation is compliant with a suite of Land Mobile Radio (LMR) standards termed P25, as described, for example, in the Telecommunications Industry Association (TIA) 102-series documents. Those skilled in the art, however, will recognize and appreciate that the specifics of this illustrative example are not specifics of the disclosure itself and that the teachings set forth herein are applicable in a variety of alternative settings. For example, the teachings herein are not limited by the network types shown but may be applied to other wireless networks such as trunked radio systems.

Both of the networks 102 and 104 provide wireless coverage for a certain geographical area, such as a city. However, inside some buildings or constructions in that geographical area, the analog wireless network 104 is accessible, while the LTE network 102 is not accessible. As used herein, accessible means that there is wireless coverage. For example, inside a building 108, the analog wireless network 104 is accessible, while the LTE network 102 is not accessible.

As mentioned above, communication system 100 also comprises four communication devices 110, 112, 114, and 116. The communication devices 110 to 116 are also commonly referred to in the art as mobile devices, user equipment, access devices, access terminals, mobile stations, mobile subscriber units, subscriber units, user devices, and the like. These communication devices can be any type of communication device such as radios, mobile phones, mobile data terminals, Personal Digital Assistants (PDAs), laptops, two-way radios, cell phones, etc.

As shown, communication device 116 is in coverage of both networks 102 and 104. Let us assume that at one point in time, the communication devices 110, 112, and 114 were in wireless coverage of both networks 102 and 104, and formed a communication group 106, wherein the communication devices 110 to 114 communicated with each other over the LTE network 102. After communication device 114 moved into the building 108, where there is no broadband coverage, all of the members of the communication group 106 could no longer communicate over the LTE network 102. Therefore, in accordance with the present teachings, the communication devices 110, 112, 114 switch to a channel on the analog wireless network 104 for the group communications of the group 106, wherein the channel is one channel in a set of channels provided to the communication devices by the GCCC 118.

Further in accordance with the present teachings, if communication device 114 leaves building 108 and moves back into coverage of the LTE network 102 (such that all three communication devices again have coverage by both wireless networks), the communication devices, 110, 112, and 114 switch back to the LTE network 102 for group communication. In addition, the GCCC 118 may perform load optimization by selecting channels having the least amount of load to include in the set of channels for members of the group 106 to use to communicate over the analog wireless network 104, where "load" is defined as a measure (such as a percentage) of the total RF resource capacity of a channel be utilized for wireless communications or wireless traffic at any given point in time.

In general, the GCCC 118 and communication devices, 110, 112, 114, and 116, of system 100 are implemented using one or more (although not shown) memory devices, network interfaces, and processing devices that are operatively coupled, and which when programmed form the means for these system elements to implement their desired functionality, for example, as illustrated by reference to the methods and diagrams shown in FIGS. 2-12.

The network interfaces are used for signaling or transmitting (e.g., packets, datagrams, frames, superframes, or any other information blocks) between the GCCC 118 and communication devices, 110, 112, 114, and 116, of system 100. The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and other well known interfaces.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the elements of system 100 may be programmed with software or firmware logic or code for performing functionality described by reference to FIGS. 2-12; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
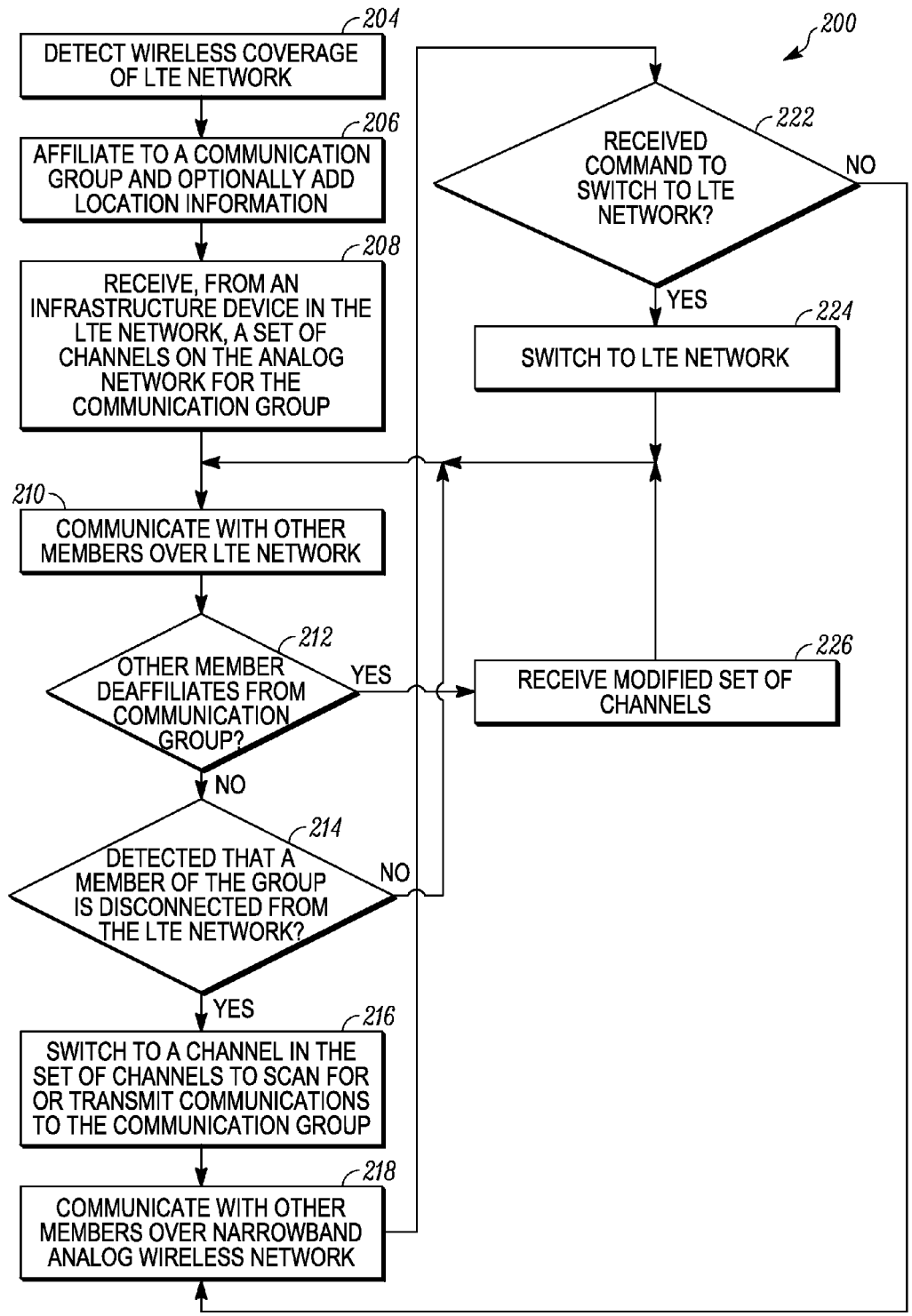
FIG. 2 is a logical flowchart illustrating a method in accordance with some embodiments.
Figure 3:
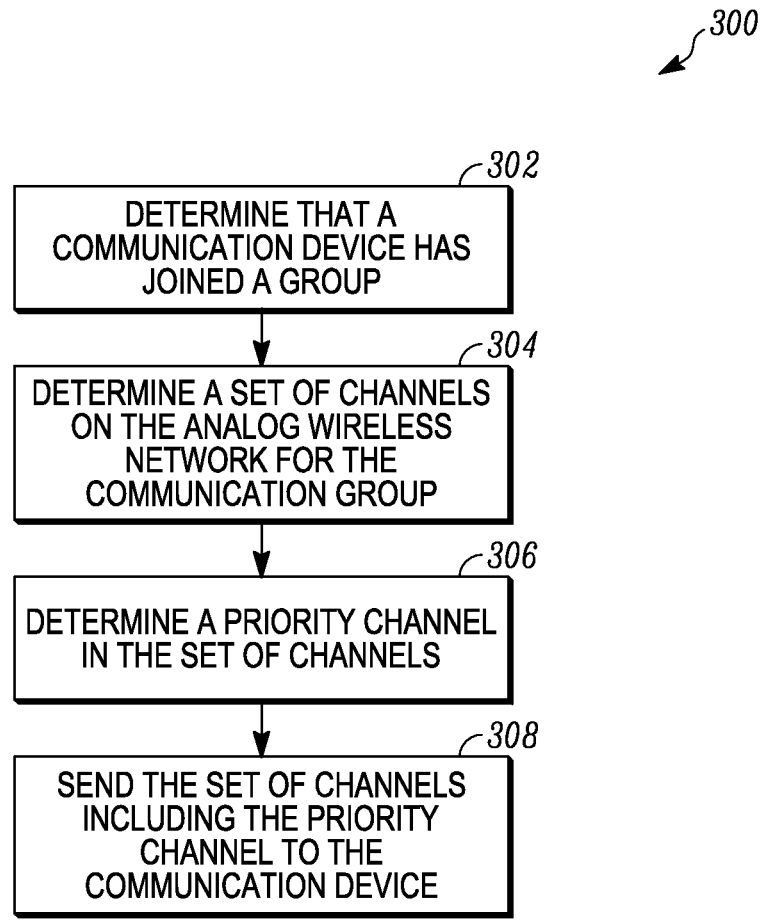
FIG. 3 is a logical flowchart illustrating a method in accordance with some embodiments.

We now turn to a detailed description of the functionality of the system 100 elements in accordance with the teachings herein and by reference to the remaining figures. FIG. 2 illustrates a logical flow diagram showing a general method 200 performed by a communication device for coordinating wireless coverage between two different wireless networks for the communication device. FIG. 3 illustrates a logical flow diagram showing a general method 300 performed by an infrastructure device (such as the GCCC 118 coupled to the LTE network 102) for coordinating wireless coverage between two different wireless networks for communication devices in a communication group. In a particular embodiment of FIG. 2 and FIG. 3, the two wireless networks are the LTE network 102 and the analog wireless network 104 of FIG. 1.

Turning first to FIG. 2, in accordance with method 200, upon power-up or roaming, the communication device detects (204) wireless coverage by the LTE network. For example, the communication device detects a downlink control channel for the LTE network 102 that is broadcast by one or more infrastructure elements of the LTE network. However, such detection can occur in any number of ways dependent on the type of wireless network, such as by the communication device tuning to a pre-programmed frequency or logical control channel(s) for receiving control information on the wireless network, receiving beacon messages, etc. Moreover, for purposes of the described implementation, it is assumed (although not required) that during normal operation, a communication device that is within range or coverage of both a broadband and a narrowband wireless network will prefer to connect to the broadband wireless network for communications, for instance due to the increased available bandwidth on the broadband wireless network for sending media.

Upon detecting network coverage, the communication device uses standard LTE protocols to connect to the LTE network. The communication device affiliates (206) to a communication group (e.g., group 106) to become a member of the communication group, and such affiliation may be by way of the LTE network 102 (via signaling over the network to GCCC 118) or may have occurred prior to the communication device connecting to the LTE network. Any suitable affiliation process can be used for a communication device to join a group including, but not limited to, a Session Initiation Protocol (SIP) affiliation process as described in Internet Engineering Task Force (IETF) Request for Comments (RFC) 3261 published June 2002, and any subsequent revisions and related RFCs, wherein the signaling to join the group is sent over the LTE network 102 and may be exchanged when the GCCC 118; or a communication device can be pre-configured with membership in one or more communication groups by a system operator. Moreover, either the communication device can directly join the communication group by carrying out the necessary affiliation signaling; or signaling can be performed by another device (such as a server in a public safety customer enterprise network (not shown)) to affiliate one or more communication devices to a communication group. In addition, the affiliation signaling sent from the communication device may optionally include (206) the device's current location to assist the GCCC in determining a set of channels to send to the communication device.

At 208, the communication device receives a set of one or more channels on the second wireless network, from the GCCC 118 for the communications of the group. The set of channels is a set of logical channels, the features of which depend on the type of the second wireless network. In this case, the second wireless network is a conventional analog wireless network 102, so the set of channels may comprise one or more channel identifiers corresponding to and identifying a set of analog frequencies (also referred to herein as the communication device receiving a set of analog frequencies). As explained earlier, other operational parameters may be sent with the one or more channel identifiers. For instance, where the second wireless network is a trunked system, the set of channels comprises channel identifiers for one or more control channels.

The set of channels is determined based on the physical location of the members of the communication group. In accordance with an embodiment, each channel in the set has a coverage area that includes at least a majority of the members in the communication group, although this is not required. In accordance with a further embodiment, the set of channels comprises multiple channels that are prioritized based on one or more criteria, and the set of channels includes at least one highest priority channel (also referred to herein simply as a "priority channel") for transmitting content within the group and/or for searching or "scanning" for a channel on which to receive content being transmitted within the group over the second wireless network.

The criteria for prioritizing the channels in the set of channels may include, but is not limited to, a set of one or more of the following factors: the size of the coverage area of the channels and set, wherein the one or more highest priority channels may have the smallest coverage area of the channels in the set or may have the smallest coverage area in which at least a majority of the members of the communication group are located; channel loading, wherein the one or more highest priority channels have the least amount of channel loading or traffic on the channel; Quality of Service (QoS), wherein the one or more highest priority channels have the best QoS; a set of rules or policies, such as a highest priority channel including in its coverage area a minimum percentage of the members of the group, but at a minimum a majority of the members of the group and in one implementation all of the members of the group; and/or a system operator could manually prioritize the set of channels (i.e., manual input), to name a few. In accordance with another embodiment, the set of channels are mapped to the communication group and comprises the scan list and transmit frequencies for the communication group.

When the members 110, 112, and 114 of communication group 106 all (or some predetermined portion of the members) are within coverage of the LTE network 102, these communication devices have group communication (210) using the RF resources of the LTE network. Such communication may include the exchange of one or more media types including a voice call only, data only, both voice call and data, video, etc. While communicating on the LTE network, one or more of the other members of the communication group or of a different communication group deaffiliate (212) from the communication group, in which case a modified set of channels for the communication group may be determined and distributed, by the GCC C 118, based on the location of the remaining members of the group and, thus, received, at 226, by the communication device and other members of the communication group.

If instead of a member deaffiliating from the communication group, the communication device within the group detects (214) that a member of the communication group has become disconnected from the LTE network 102, and the communication device switches (216) one of the channels in the set of channels (provided, at 208, by the GCCC 118) to continue (218) the group communications using the analog network 104. This detection, at 214, can come by way of the communication device detecting its own loss of coverage within the LTE network 102 or by way of the communication device receiving a command from the GCCC 118 to switch to the analog network because one or more of the other members of the communication group has become disconnected from and is experiencing a loss of coverage within the LTE network 102.

By switching to a channel, what is meant is that the communication device selects a channel to begin scanning for transmissions from other group members or to begin its own transmissions to the communication group. In one example implementation, selecting the channel for scanning or transmitting is performed in an order from the highest priority channel to the lowest priority channel in a set of prioritize channels. Other members of the communication group are also directed by the GCCC 118 to switch to the analog network 104 to continue the group communication. A loss of coverage is defined as a communication device becoming disconnected from the network or losing communication with the network for a period of time that exceeds a known threshold.

There are numerous ways by which a communication device detects or determines that it is out of coverage of and/or is disconnected from a wireless network. For example, the communication device becomes unable to detect the control channel or the broadcasts of control messages by the wireless network. In another illustrative implementation, the communication device determines connection status based on radio link quality. In accordance with another example, the communication device periodically sends a Keep-Alive message to an infrastructure device, such as the GCCC 118. If the communication device fails to receive replies, from the infrastructure device, to its Keep-Alive message for a certain predetermined time period, then communication device concludes that its connection to the wireless network has been lost. In addition, the infrastructure device may similarly conclude that a communication device has transitioned out of wireless network coverage if the infrastructure device fails to receive a certain number of Keep-Alive messages from the communication device during a predetermined time period; and the infrastructure device can accordingly direct other members of the communication group to switch to the alternative wireless network to continue (218) the group communication. This direction or notification can be done using any suitable messaging.

As mentioned above, a communication device "switching" to a channel in the set of channels on the second wireless network may mean that if the communication device is transmitting, it selects and attempts to switch or connect to an identified highest priority channel to continue its transmissions; and upon failure to connect to the highest priority channel (e.g., because it's overloaded, etc.) it attempts to continue to connect to a channel in decreasing order of channel priority (e.g., in increasing order of channel coverage area, in increasing order of channel loading, etc.). If the communication device was receiving media, it selects and switches to the highest priority channel to begin scanning for group communication transmissions, wherein the scanning of the channels proceeds in decreasing order of channel priority (e.g., in increasing order of channel coverage area, in increasing order of channel loading, etc.) until a channel is found containing the group communications.

At 222, as long as less than a majority of the members of the communication group are outside of coverage of the LTE network, the communication devices within the group continue to communicate (218) over the analog wireless network. Otherwise, the communication devices switch (224) to the LTE network for group communication, at 210. The communication devices perform the switching to the LTE network in response to a command, at 222, from the GCCC 118. Turning back to 214, if no member is disconnected from the LTE network, the communication device continues to communicate with other members of the communication group using the LTE network, at 210.

Referring now to the companion method 300 of FIG. 3, an infrastructure device (e.g. GCCC 118) initializes and determines (302) that a communication device has joined a communication group. This can be done in a number of ways. In one example implementation, the communication device exchanges signaling with the GCCC 118 to affiliate to the group. In another illustrative implementation, the communication device connects to the LTE network and as a part of the connection process notifies the GCCC 118 of its group affiliations. In yet another illustrative implementation, the GCCC 118 is pre-programmed with the group memberships of the communication device.

Upon learning of the communication device joining or affiliating with a communication group, the infrastructure device determines (304) a set of channels on the analog wireless network for the group, wherein, as described earlier, the set of channels is determined based on the physical location of at least a portion of the members of the communication group; determines (306) one or more priority channels (e.g., highest priority channels) in the set of channels; and sends (308) the set of channels including the priority channel(s) to the communication device. The GCCC 118 may ascertain the physical location of a communication device by radio triangulation or other technologies known to a person skilled in the art. For example, the GCCC 118 determines the physical location of a communication device by the location information placed in periodic keep alive messages that the communication device sends to the GCCC 118. Location information may also be included in the group affiliations signaling, as mentioned earlier.

Details of the functionality of an LTE infrastructure device such as the GCCC 118 in accordance with the present teachings are further described with respect to the reaming FIGS. 4 to 12. However, in general, in accordance with the present disclosure the LTE (first network) infrastructure device may further update or modify a current set of channels for an existing member for the communication group based on the location of the joining communication device and the location of the existing member and send the updated set of channels to the existing member, when the communication device joins an existing group; and updating the current set of channels may include determining one or more least loaded channels that has a coverage area that includes the joining communication device. Similarly, when the communication device joins the existing group, the infrastructure device may update or modify a current priority channel in the set of channels for an existing member and send the updated priority channel to the existing member. Moreover, the LTE infrastructure device may further update or modify a current set of channels for the communication group based on an updated location of a communication device as the communication device moves.

In addition, the GCCC 118, upon determining that one or more members of the communication group have transitioned from the LTE network to the analog wireless network, may notify the other members of the communication group to switch to the analog wireless network for the group communications. Conversely, when the GCCC 118 determines that at least a majority of the communication devices are now within coverage of the LTE network, the GCCC 118 may notify the members of the communication group to transition back to the LTE network for the group communications. Furthermore, as communication devices deaffiliate from the group, the LTE infrastructure device may modify or update the set of channels or select one or more different highest priority channels.

In addition, a channel in the set of channels for a joining communication device may be the same as is included in a set of channels for another member of the communication group, based on the location of the joining communication device and the location of the other member of the communication group. In further implementation, a first channel in the set of channels for the joining communication device has a coverage area wherein the only member of the communication group that is located in the coverage area is the joining communication device, wherein the first channel is a least loaded channel in the analog wireless network having the same coverage area as the first channel and that includes the joining communication device in its coverage area.

In yet another illustrative implementation, the GCCC 118 detects a trigger event; performing a channel load optimization process that results in a change of a channel included in a current set of channels on the analog wireless network for at least one member in the communication group; generates an updated set of channels for the at least one member in the communication group based on the change of the channel; and communicates the updated set of channels to the at least one member in the communication group. The trigger event may include one or more of: a change in membership of the communication group or of another communication group; or a change in location of a member of the communication group or of a member of another communication group.

Figure 4:
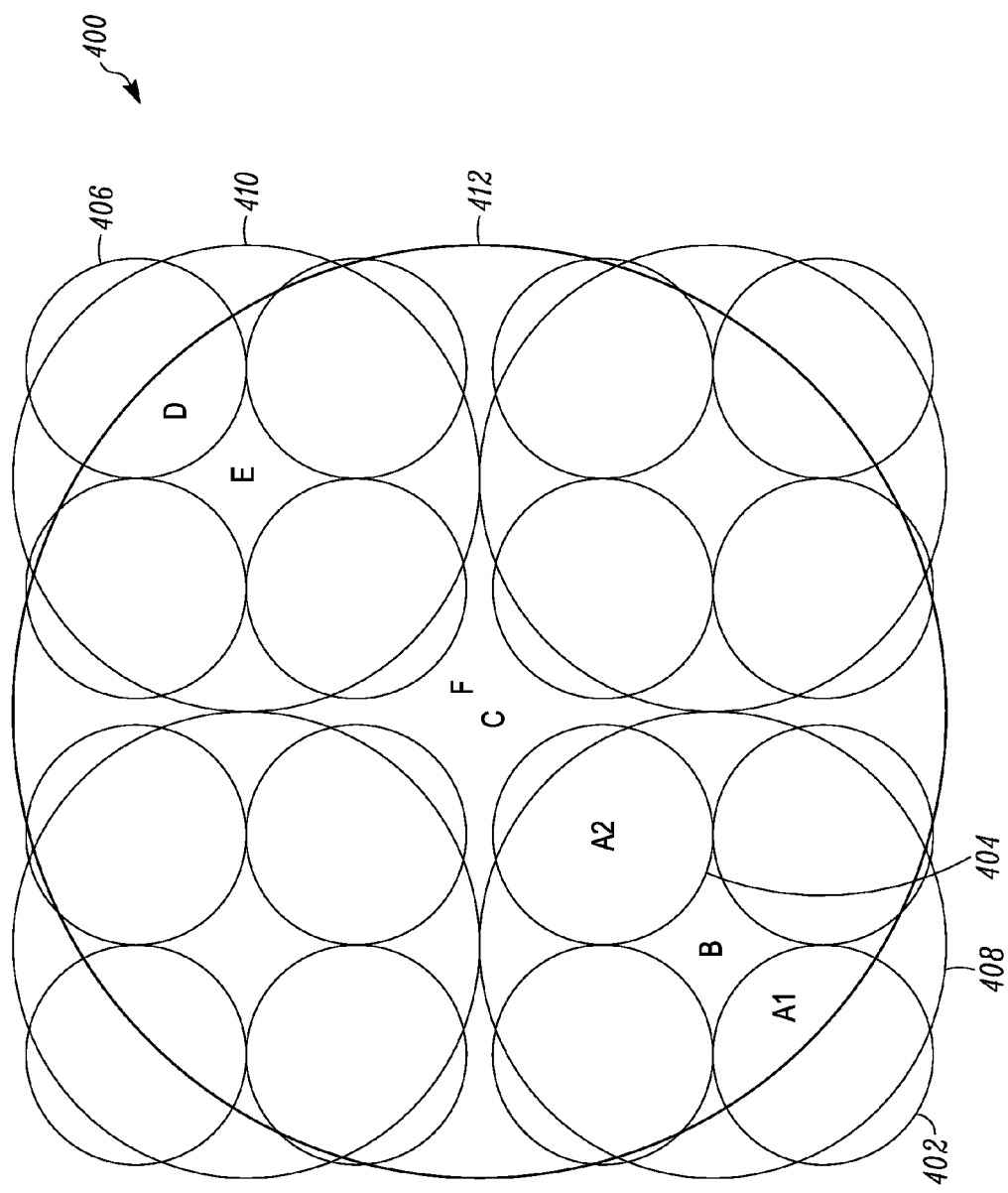
FIG. 4 illustrates a frequency overlay map of a narrowband analog wireless network in accordance with some embodiments of the present teachings.

Referring now to FIG. 4, an illustrative frequency overlay map 400 of a conventional narrowband analog wireless network is shown, wherein implementations in accordance with the present teachings are described by referenced to FIGS. 5 to 12. The analog wireless network provides coverage over a city using a plurality of channels, each being characterized at least by a channel ID and an analog frequency corresponding to a physical resource. Different frequencies of the analog wireless network have different coverage areas, and the different coverage areas are categorized herein as patrolzones, boroughs, and citywide. Patrolzones have the smallest coverage areas, while a citywide frequency has the largest coverage area. A frequency that covers a patrolzone is termed herein a patrolzone frequency. For example, a patrolzone frequency A1 covers an area 402 (also interchangeably referred to as patrolzone A1), a patrolzone frequency A2 covers an area 404 (also interchangeably referred to as patrolzone A2), a patrolzone frequency D covers an area 406 (also interchangeably referred to as patrolzone D).

Boroughs have larger coverage areas than patrolzones. A frequency that covers a borough is termed herein a borough frequency. For example, a borough frequency B covers an area 408 (also interchangeably referred to as borough B), and a borough frequency E covers an area 410 (also interchangeably referred to as borough E). Each borough includes one or more patrolzones. For example, the borough 408 includes the patrolzones 402 and 404. A citywide frequency has the largest coverage area, and includes a majority portion or all of a city. A frequency that covers a citywide coverage area is termed herein a citywide frequency. For example, both a citywide frequency C and a citywide frequency F cover a citywide area 412 (also interchangeably referred to as citywide C and citywide F). A citywide coverage area includes one or more boroughs. For example the citywide area 412 includes the boroughs 408 and 410. It should be noted that one borough may partially overlap with one or more other boroughs, and one patrolzone may overlap with one or more other patrolzones. It should be noted that citywide frequency C and citywide frequency F have the same coverage area in this illustrative embodiment. In alternate embodiments, two citywide frequencies may not have the exact same coverage areas.

Figure 5:
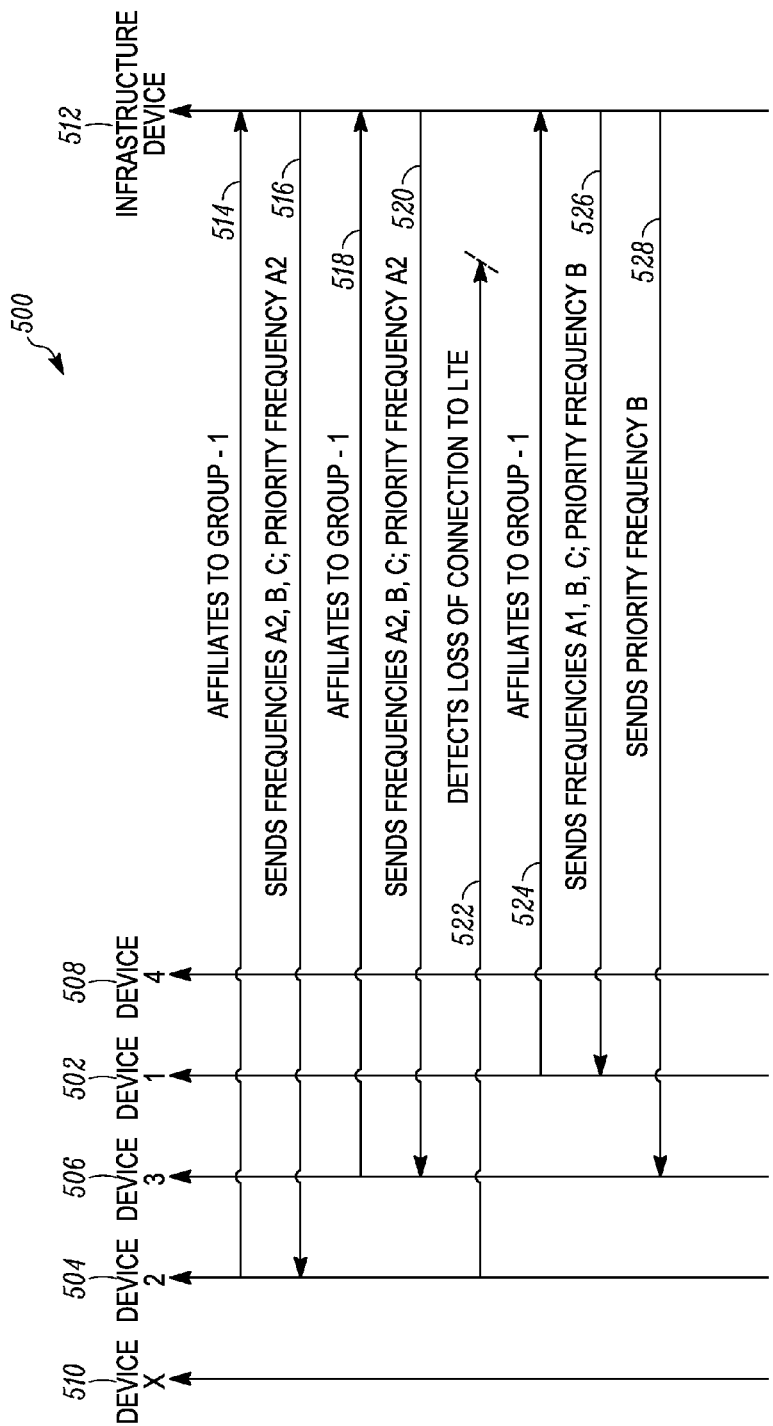
FIG. 5 illustrates a message sequence diagram in accordance with some embodiments.
Figure 6:
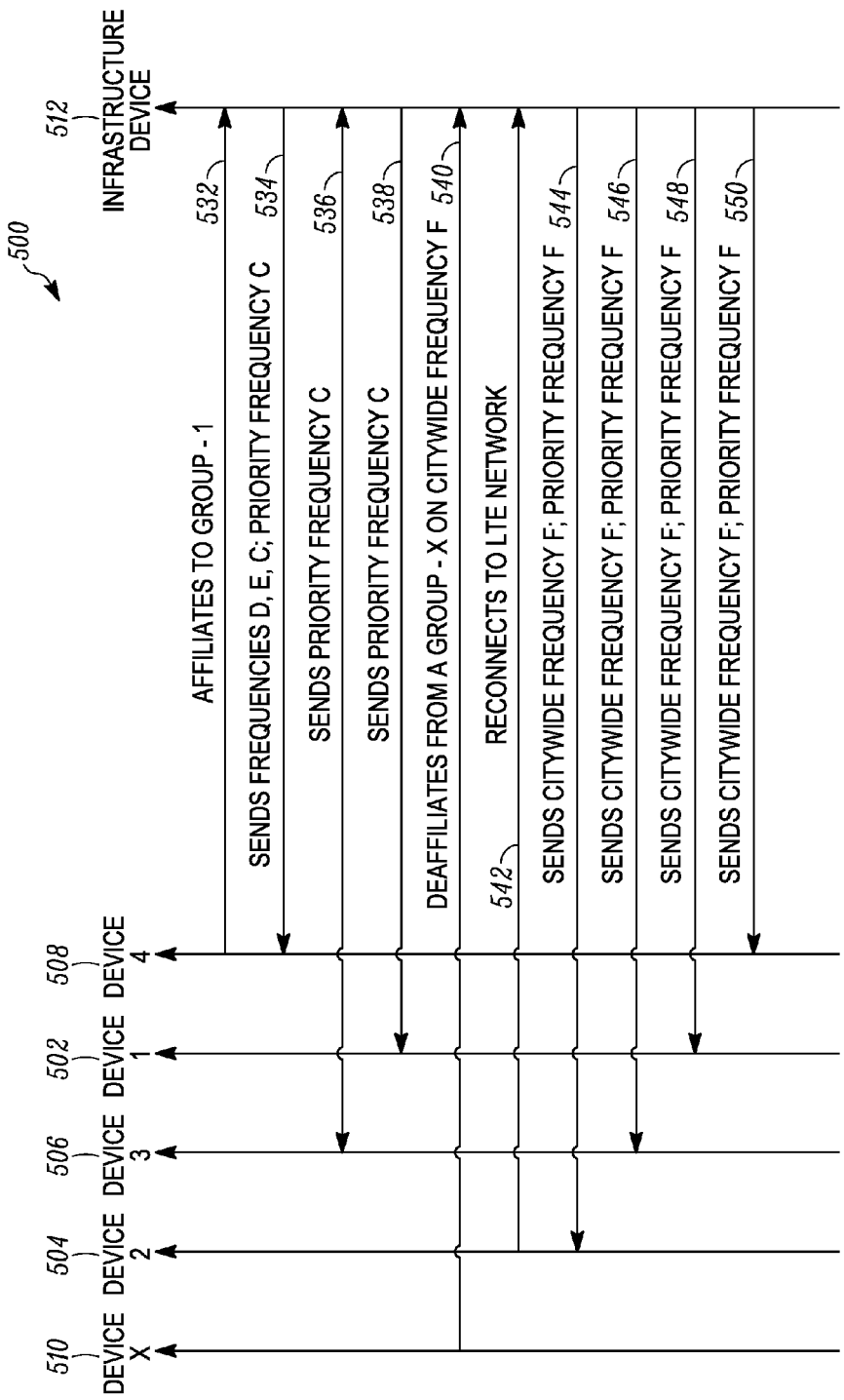
FIG. 6 illustrates a message sequence diagram in accordance with some embodiments.

Turning now to FIG. 5 and FIG. 6, a message sequence chart 500 illustrating some embodiments in accordance with the present teachings is shown. The message sequence chart 500 starts in FIG. 5 and continues in FIG. 6. The embodiments described by reference to FIG. 5 and FIG. 6 are illustrated as being implemented using a LTE network and a conventional analog wireless network, such as is shown in FIG. 1. The analog wireless network has a frequency overlay map as disclosed in FIG. 4. This particular illustrative implementation assumes that a communication device 502 (also labeled as Device 1) is within the coverage area of patrolzone A1, borough B, and citywide C. A communication device 504 (also labeled as Device 2) is within the coverage area of patrolzone A2, borough B, and citywide C. A communication device 506 (also labeled as Device 3) is within the coverage area of patrolzone A2, borough B, and citywide C. A communication device 508 (also labeled as Device 4) is within the coverage area of patrolzone D, borough E, and citywide C. The communication devices, 502, 504, 506, and 508, interact with an LTE network infrastructure device 512 to affiliate with a group (labeled as "Group-1") in order to transmit and receive communications for Group-1.

At 514, Device 2 sends the infrastructure device 512 a request to affiliate with Group-1. Because Device 2 is physically located inside patrolzone A2, borough B, and citywide C, the LTE infrastructure device 512 sends back to Device 2 the patrolzone frequency A2, borough frequency B, and citywide frequency C at 516, e.g., in the form of channel identifiers. Because patrolzone A2 is the smallest coverage area that includes all the members, or at least a majority of the members, of Group 1, i.e., Device 2, the LTE infrastructure device 512 selects patrolzone frequency A2 as the priority channel (also interchangeably referred to as a priority frequency), and sends the priority frequency A2 to Device 2 at 516. As used herein, the priority frequency is always the first choice over which members of a communication group transmit media and scan to receive media.

When Device 2 affiliates with Group 1, citywide frequency F is more heavily loaded with communication groups than citywide frequency C. Accordingly, the infrastructure device 512 selects citywide frequency C, not citywide frequency F, as the citywide frequency for Group-1. Thus, the selection of frequencies for the set may also depend on channel loading. If Device 2 transitions out of LTE coverage, it should scan the three analog conventional frequencies, A2, B, and C (beginning with the priority frequency A2), to connect to other members of Group-1. Furthermore, Device 2 should communicate, e.g., transmit to other members of Group-1 over the priority frequency A2. If, for example, Device 2 fails to communicate with a second device over the priority channel A2, Device 2 should try to communicate (transmit or receive) with the second device over frequency B and then C in order of increasing channel coverage area. Moreover, when Device 2 fails to communicate with other devices of Group-1 over the priority channel A2, Device 2 should scan the frequencies B and C in order of increasing channel coverage area, to detect any transmission.

At 518, Device 3 requests to affiliate with Group-1. The infrastructure device 512 determines that Device 3 is physically located inside patrolzone A2, borough B, and citywide C. Furthermore, both Device 2 and Device 3 are in patrolzone A2, which is the smallest analog wireless network coverage area that includes both Device 2 and Device 3. Accordingly, the infrastructure device 512 sends back to Device 3 the patrolzone frequency A2, borough frequency B, and citywide frequency C at 520, and identifies frequency A2 as the priority frequency. Because Device 2 has the same priority channel, A2, the infrastructure device 512 does not send the priority frequency A2 to Device 2 again.

At 522, Device 2 loses connection to the LTE network. When Device 2 is outside of LTE coverage, i.e., disconnected from LTE network, Device 3 will fail to transmit data to Device 2 over the LTE network. Accordingly, Device 3 recognizes that Device 2 is out of LTE coverage. Alternatively, Device 3 may obtain such knowledge from the infrastructure device 512. Therefore, device 3 may try to transmit data to Device 2 over priority frequency A2. Because Device 2 is disconnected from LTE network, Device 2 will scan the priority frequency A2, wherein Device 2 detects a transmission from Device 3. The alternative scenario is also possible, wherein Device 2 transmits first on the priority frequency A2, which is detected by Device 3.

At 524, Device 1 requests to affiliate with Group-1. Because Device 1 is physically located inside patrolzone A1 and borough B, and the citywide frequency for Group-1 is citywide frequency C, the LTE infrastructure device 512 sends to Device 1 the patrolzone frequency A1, borough frequency B, and citywide frequency C at 526. The smallest LTE coverage area that includes Device 1, Device 2, and Device 3 is borough B. Therefore, the LTE infrastructure device 512 selects borough frequency B as the priority frequency for Group-1, and sends the priority frequency B to Device 1 at 526. Because Device 3 is still in LTE network coverage, the infrastructure device 512 sends the new priority frequency B to Device 3 at 528. It should be noted that Device 2 is out of LTE network coverage at this point, and the infrastructure device 512 cannot send the new priority frequency B to Device 2. However, Device 2 scans both borough frequency B and citywide frequency C for transmissions from group members. Accordingly, when other members of Group-1 (such as Device 3) transmit over borough frequency B, Device 2 can detect such transmission and set borough frequency B as the priority frequency. Thereafter, Device 1, Device 2, and Device 3 communicate with each other over borough frequency B.

Referring now to FIG. 6, at 532, Device 4 requests to affiliate with Group-1. Because Device 4 is physically located inside patrolzone D and borough E, and the citywide frequency for Group-1 is citywide frequency C, the infrastructure device 512 sends to Device 4 the patrolzone frequency D, borough frequency E, and citywide frequency C at 534. The frequency that has the smallest coverage area including all the members of Group-1, Device 1, Device 2, Device 3, and Device 4, is citywide C. Therefore, the LTE infrastructure device 512 selects citywide frequency C as the priority frequency Group-1, and sends the priority frequency C to Device 4 at 534.

Because Device 1 and Device 3 are still in LTE network coverage at this point, the infrastructure device 512 sends the new priority frequency C to Device 3 at 536 and Device 1 at 538. It should be noted that Device 2 is out of LTE network coverage at this point, and the infrastructure device 512 cannot send the new priority frequency C to Device 2. However, Device 2 scans both borough frequency B and citywide frequency C for transmissions from group members. Accordingly, when other members of Group-1 (such as Device 4) transmit over citywide frequency C, Device 2 detects such transmission and sets citywide frequency C as the priority frequency for transmission. Thereafter, Device 1, Device 2, Device 3, and Device 4 communicate with each other over citywide frequency C.

At 540, a communication device 510 (also labeled as Device X) deaffiliates from Group-X. For the purpose of illustration of the present teachings it is assumed that: at this point, the citywide frequency of Group X is citywide frequency F; Group-X dissolves since Device X is the last member of Group-X; there are no more communication groups on citywide frequency F; and there are a few communication groups (including Group-1) on citywide frequency C. Turning now to 542, where Device 2 transitions back into the LTE network coverage and reconnects with the LTE network. Since all members of Group-1 are in LTE network coverage now, they can now communicate with each other over the LTE network. Furthermore, the infrastructure device 512 can optimize network load on citywide frequency C. Since citywide frequency F has no communication groups, and is thus less loaded than citywide frequency C, the infrastructure device 512 selects citywide frequency F as the citywide frequency and priority frequency for Group-1.

It should be noted that there are numerous ways to determine the load on a frequency, such as citywide frequency. For example, the number of communication groups on a citywide frequency may be used to measure load on that citywide frequency. Another example, the number of communication devices on a citywide frequency may be used to measure load on that citywide frequency. Another example, the number communication devices that are using a citywide frequency as priority frequency may be used to measure load on that citywide frequency. The infrastructure device 512 updates Device 2, Device 3, Device 1, and Device 4 with new citywide frequency F and new priority frequency F at 544, 546, 548, and 550 respectively.

Figure 7:
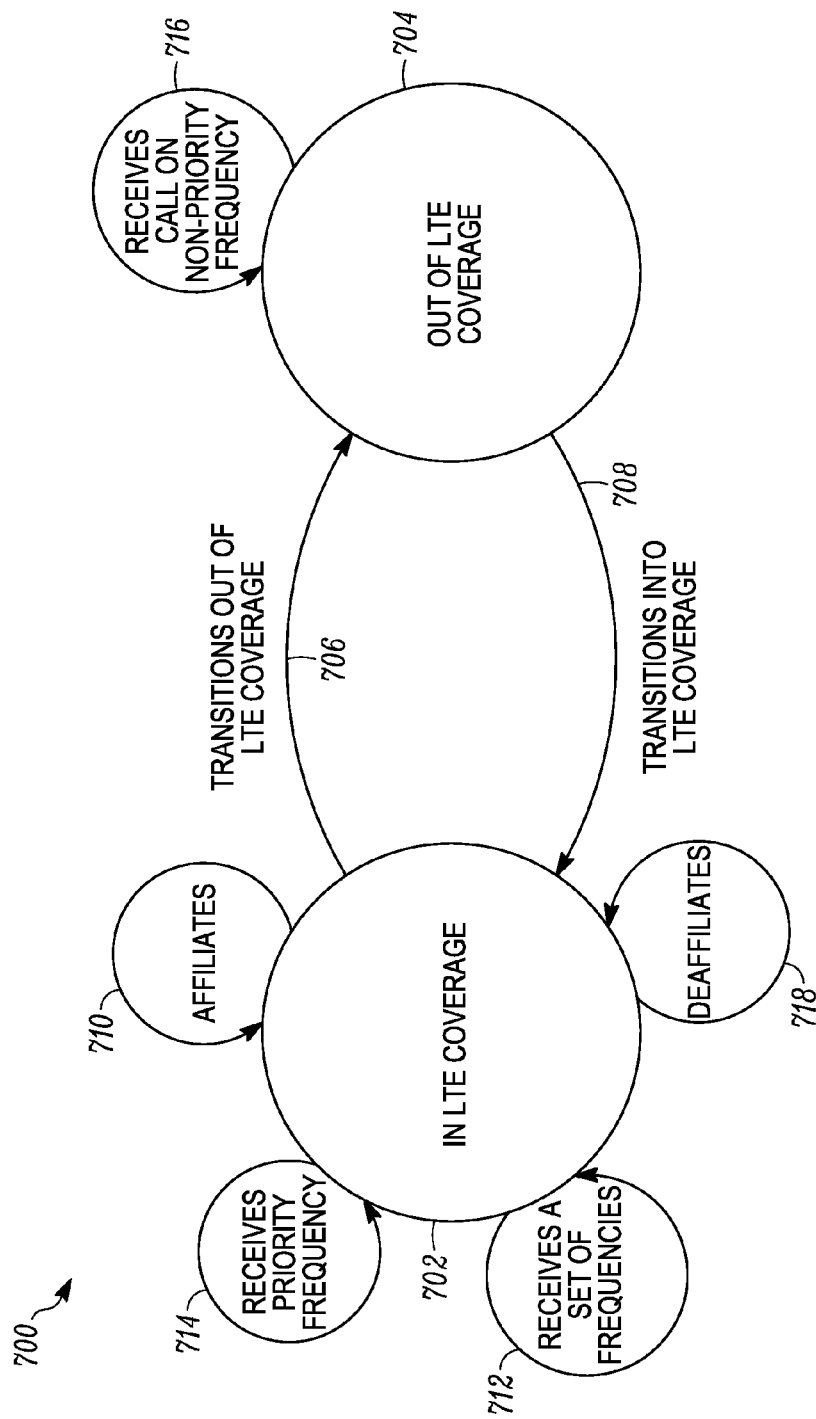
FIG. 7 illustrates a state transition diagram in accordance with some embodiments.

Referring now to FIG. 7, a state transition diagram 700 of a communication device in accordance with some embodiments of the present teachings is illustrated. FIG. 7 further illustrates the teachings disclosed in FIGS. 1 through 6. The state transition diagram comprises two states, 702 where the communication device is inside a LTE network coverage, and 704 where the communication device is out of LTE network coverage. In state 704, the communication device is, for example, in coverage of a conventional analog wireless network as shown in FIG. 4. The communication device transitions from state 702 to state 704 in response to event 706. The event 706 comprises the communication device's transitioning out of LTE network coverage area. In state 704, the communication device has knowledge of a priority frequency within a set of frequencies, such as patrolzone, borough, and citywide frequencies. The communication device uses the priority channel to transmit media and to begin scanning the set of frequencies to receive media from other members of the communication device's communication group.

An event 716 occurs when the communication device is in state 704, and detects transmission on a frequency that is different from the priority frequency. In response to event 716, the communication device sets the priority frequency to the frequency over which transmission is detected. The communication device transitions from state 704 to state 702 in response to event 708. The event 708 comprises the communication device's transitioning back into the LTE network coverage area.

In state 702, an event 710 occurs when the communication device affiliates to a communication group. In response to event 710, an infrastructure device of LTE network sends a set of frequencies, such as patrolzone, borough, and citywide frequencies, which is received (712) by the communication device. In addition, a priority frequency is identified out of the set of frequencies and the identification sent (714) to the communication device. In addition, the communication device might receive (712) a modified set of frequencies for one or more reasons such as a communication device joining or leaving the communication group or a different communication group, the LTE network optimizing load on the frequencies, etc. Moreover, the communication device could receive (714) a different priority frequency for one or more reasons such as another communication device joining the communication group and being located in a different patrolzone from a patrolzone that is currently designated as the priority frequency.

An event 718 occurs when the communication device deaffiliates or leaves the communication group. When event 718 occurs, the LTE network may again perform load optimization on frequencies of the communication group, and as a result change the set of frequencies for the group and/or change the priority frequency, for instance, to a frequency having a smaller coverage area.

Figure 8:
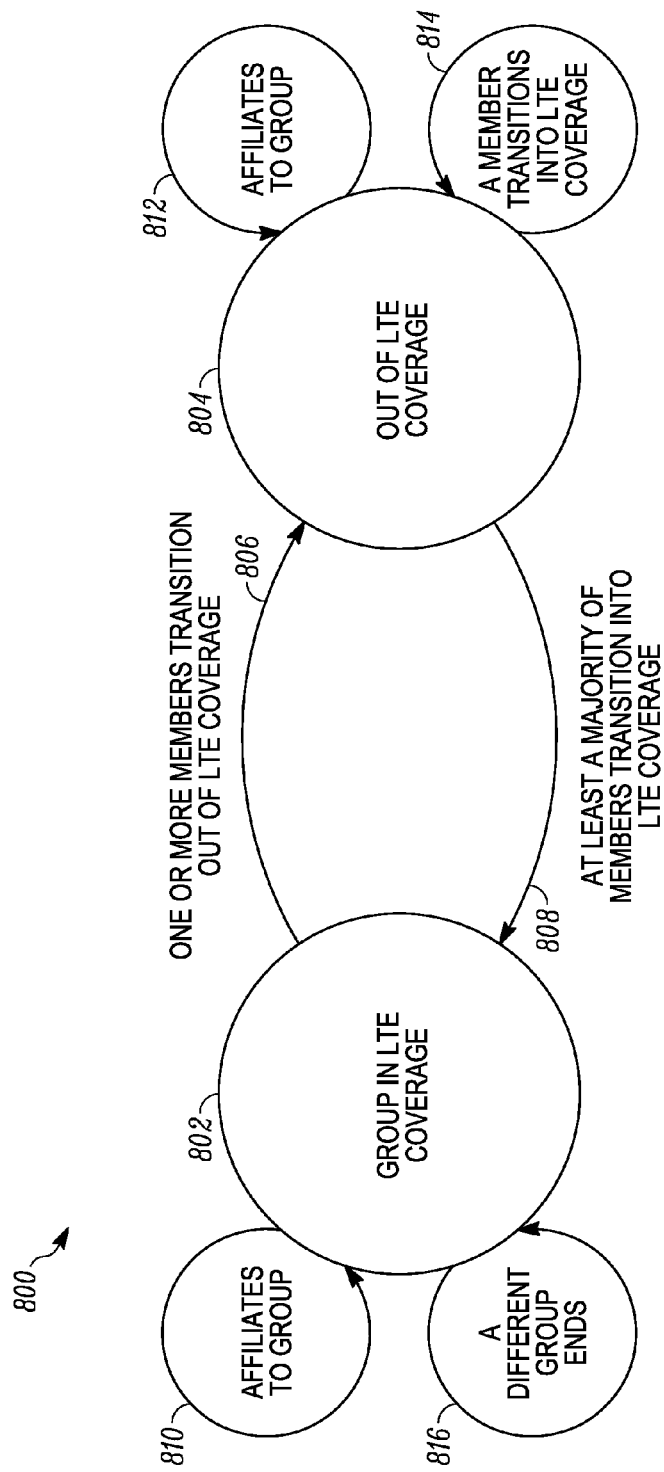
FIG. 8 illustrates a state transition diagram in accordance with some embodiments.

Referring now to FIG. 8, a state transition diagram 800 of an infrastructure device coupled to an LTE network in accordance some embodiments of the present teachings is illustrated. FIG. 8 further illustrates the teachings disclosed in FIGS. 1 through 7. The state transition diagram comprises two states, 802 where every communication device (or at least a majority of the communication devices) of a communication group is in the LTE network coverage, and 804 where one or more communication devices of the communication group are out of the LTE network coverage. In state 804, the group communication takes place over a conventional analog wireless network as shown in FIG. 4. The infrastructure device transitions from state 802 to state 804 in response to event 806. The event 806 occurs when one or more communication devices of the communication group transitions out of LTE network coverage. Conversely, the infrastructure device transitions from state 804 to state 802 in response to event 808, and sends a message to all communication devices of the group to switch back to the LTE network. The event 808 occurs, for instance, when the last communication device of the communication group that is out LTE network coverage transitions back into the LTE network coverage. Alternatively, even 808 may occur when at least a majority of the members of the communication group is back in the LTE network coverage.

In response to event 808 and an event 816, which occurs when a different communication group's last member deaffiliates from that group, the infrastructure device may optimize load on the frequencies that have been assigned to the active communication group(s). For example, if the citywide frequency for the active communication group is citywide frequency C, and citywide frequency C is more loaded than citywide frequency F, the infrastructure device may set citywide frequency F as the citywide frequency for the active communication group. Accordingly, the infrastructure device sends the citywide frequency F to each member of the active communication group. If the citywide frequency is the priority frequency for the communication group, the infrastructure device sends the citywide frequency F as the priority frequency to each member of the communication group. It should be noted that there are many ways to determine and compare loads on frequencies as described earlier.

When the infrastructure device is in either state 802 or 804, any communication device outside the communication group may request to affiliate with the communication group, i.e., event 810 and 812. In response to event 810 or 812, the infrastructure device determines the set of frequencies for scanning for the new member communication device, and sends the set of frequencies to that communication device over the LTE network. Moreover, the infrastructure device determines a priority frequency for the communication group. The infrastructure device sends to the new member communication device the priority frequency. For every other member of the communication group, if the newly determined priority frequency is different than the current priority frequency of the communication group, the infrastructure device sends the newly determined priority frequency to each member communication device that is in LTE network coverage. Event 814 occurs when a member of the communication group transitions back into LTE coverage when the infrastructure device is in state 804. In response to event 814, the infrastructure device determines a priority frequency for this member, and sends the priority frequency to this member.

Figure 9A:
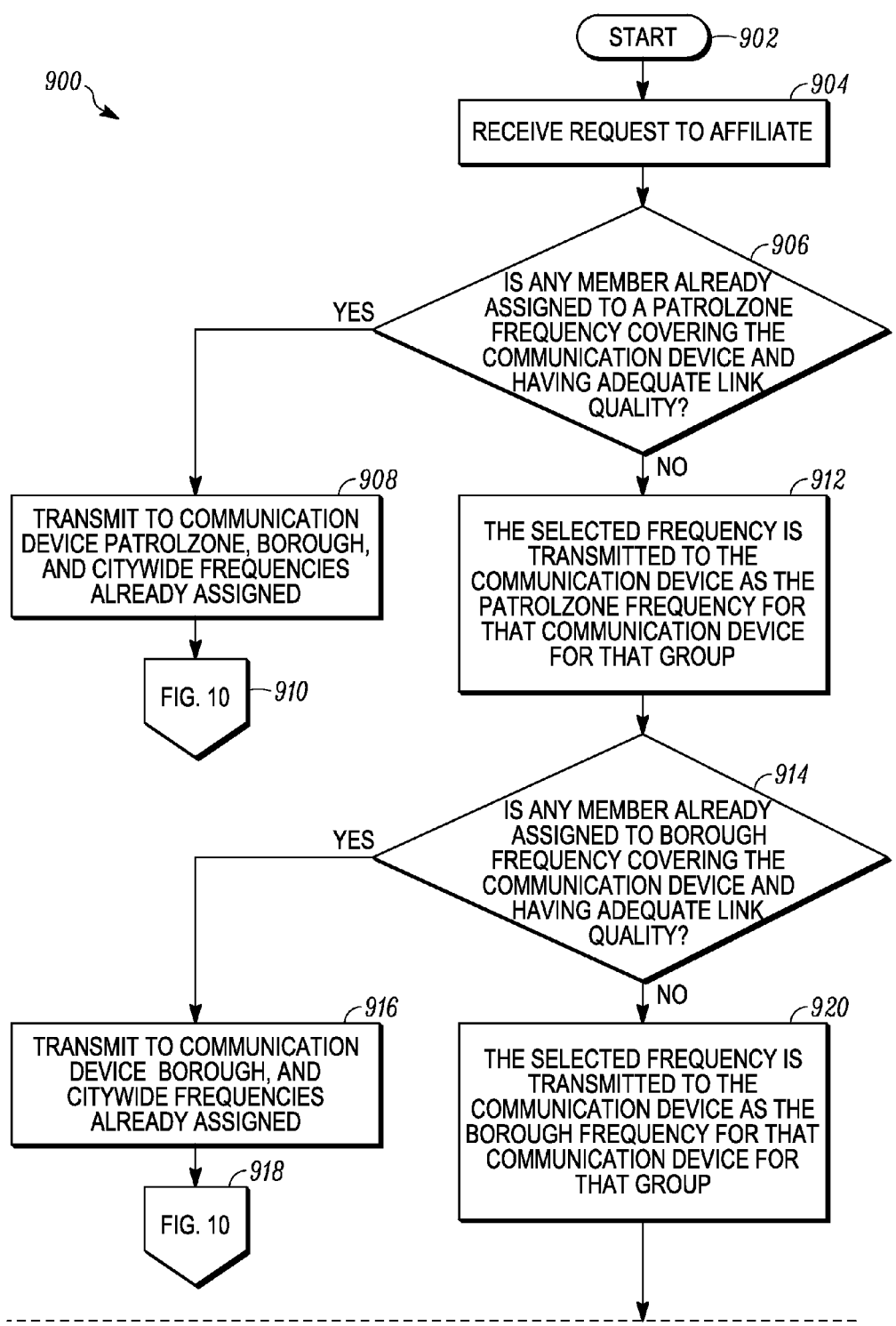
FIG. 9 (divided into FIGS. 9A and 9B) is a logical flowchart illustrating a method in accordance with some embodiments.
Figure 9B:
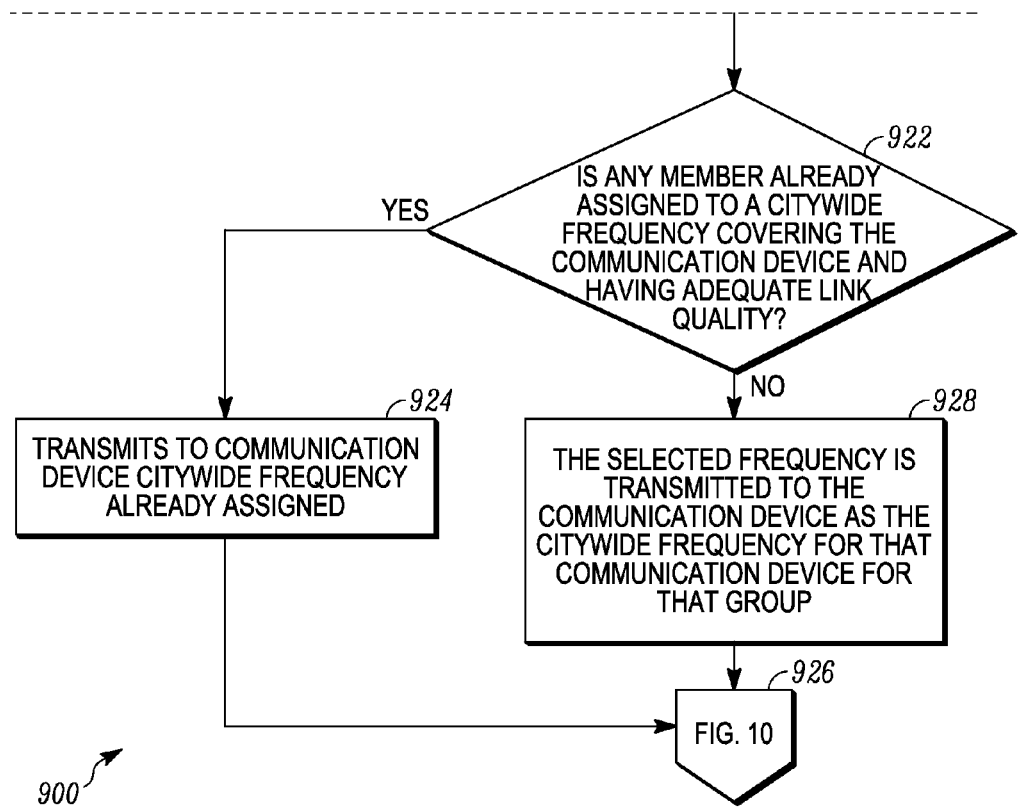

FIGS. 9, 10, 11 and 12 each illustrates a flow diagram showing a method in accordance with some embodiments of the present teachings. Referring first to FIG. 9 (which is broken up into FIG. 9A and 9B), a method 900 is performed by an infrastructure device couple to the LTE network for determining patrolzone, borough, and citywide frequencies in response to a communication device's request to affiliate with a communication group. This occurs, for example, in trigger events 810 and 812 of state transition diagram 800 (FIG. 8) for the infrastructure device.

Method 900 begins at 902 with the communication device in wireless coverage of the LTE network. At 904, the communication device sends a request to affiliate to the communication group to an infrastructure device coupled to the LTE network, and the infrastructure device receives the request. At 906, the infrastructure device determines whether there is any communication device in the communication group that has been assigned to a patrolzone frequency that covers the physical location of the communication device, and has adequate link quality. As used herein, link quality can be measured by link margin or other parameters of a wireless network. If there is such a member communication device, the infrastructure device transmits (908) the found member's assigned patrolzone, borough, and citywide frequencies to the requesting communication device. Determination of a priority frequency within the assigned patrolzone, borough, and citywide frequencies for the communication device, at 910, is further illustrated by reference to FIG. 10.

Figure 10:
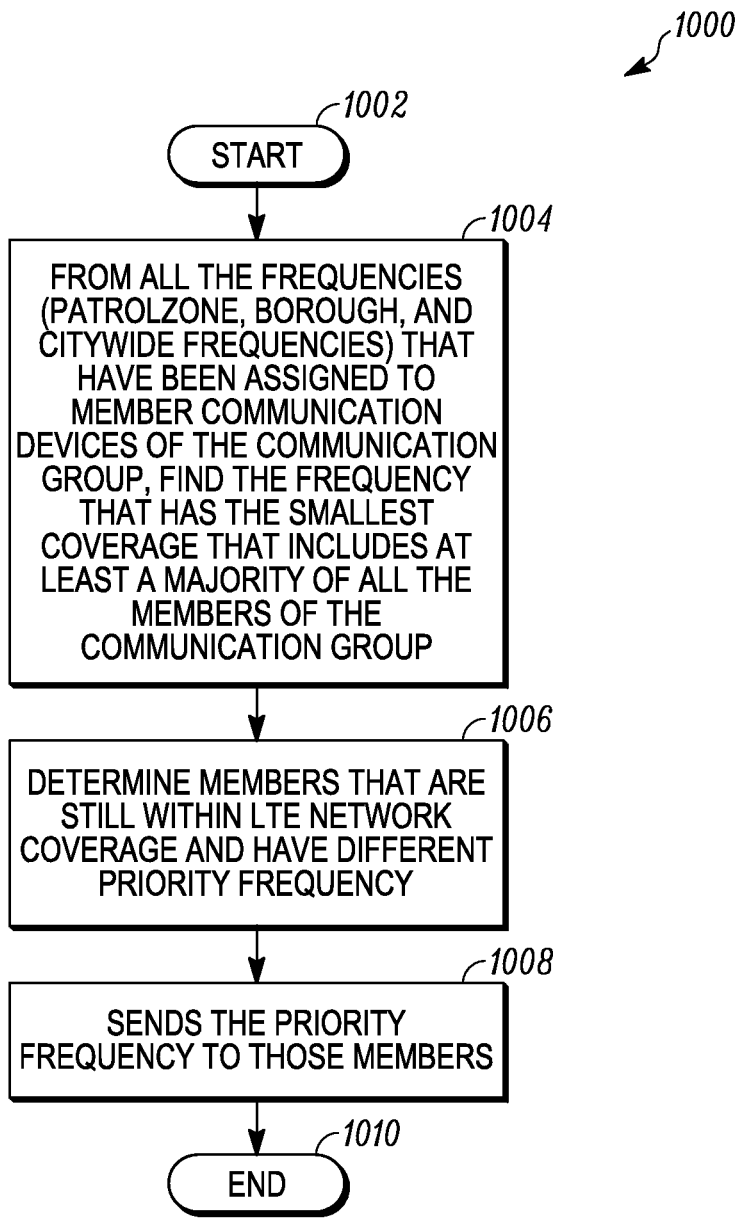
FIG. 10 is a logical flowchart illustrating a method in accordance with some embodiments.

Turning momentarily to FIG. 10, a method 1000 of determining a priority frequency for a communication group to transmit and receive data in accordance with the present teachings is shown. Method 1000 is performed by an infrastructure device coupled to an LTE network, and starts at 1002. At 1002, the infrastructure device has knowledge of all communication devices of a communication group, such as the patrolzone, borough, and citywide frequencies of each member. At 1004, the infrastructure device finds a frequency, from all the patrolzone, borough, and citywide frequencies that have been assigned to communication devices of the communication group, with the smallest coverage area that includes at least a majority of all the members of the communication group. Different embodiments in accordance with the present teachings may vary in the standard of selecting the frequency. For example, in one embodiment, a frequency with the smallest coverage area that includes all the members of the communication group is selected.

At 1006, the infrastructure device further determines the communication devices in the communication group that are still in the LTE network coverage, but have a priority frequency different from the newly selected priority frequency. At 1008, the infrastructure device sends the new priority frequency to each member that is still in the LTE network coverage, but has a different priority frequency. Method 1000 ends at 1010 after the newly selected priority frequency is sent out.

Turning back to decision block 906 of FIG. 9, if there is no communication device in the communication group that has been assigned to a patrolzone frequency that covers the physical location of the communication device, and has adequate link quality, the infrastructure device selects a least loaded patrolzone frequency having a coverage area in which the communication device is located, and having adequate link quality and sends (912) the patrolzone frequency to the communication device as the patrolzone frequency for that communication device for that communication group. At 914, the infrastructure device determines whether there is any communication device in the communication group that has been assigned to a borough frequency that covers the physical location of the communication device, and has adequate link quality. If there is such a member communication device, the infrastructure device transmits the found member's assigned borough and citywide frequencies to the requesting communication device, at 916. Determination of a priority frequency within the assigned patrolzone, borough, and citywide frequencies for the communication device at 918 is further illustrated by reference to FIG. 10, as described above in detail.

Turning back to 914, if there is no communication device in the communication group that has been assigned to a borough frequency that covers the physical location of the communication device and has adequate link quality, the infrastructure device selects a least loaded borough frequency having a coverage area in which the communication device is located, and having adequate link quality and sends (920) the borough frequency to the communication device as the borough frequency for that communication device for that communication group. At 922, the infrastructure device determines whether there is any communication device in the communication group that has been assigned to a citywide frequency that covers the physical location of the communication device, and has adequate link quality. If there is such a member communication device, the infrastructure device transmits the found member's assigned citywide frequency to the requesting communication device, at 924.

Turning back to 922, if there is no communication device in the communication group that has been assigned to a citywide frequency that covers the physical location of the communication device, and has adequate link quality, the infrastructure device selects a least loaded citywide frequency having a coverage area in which the communication device is located, and having adequate link quality and sends (928) the citywide frequency to the communication device as the citywide frequency for that communication device for that communication group. Finally, determination of a priority frequency within the assigned patrolzone, borough, and citywide frequencies for the communication device at 926 is further illustrated by reference to FIG. 10.

Figure 11:
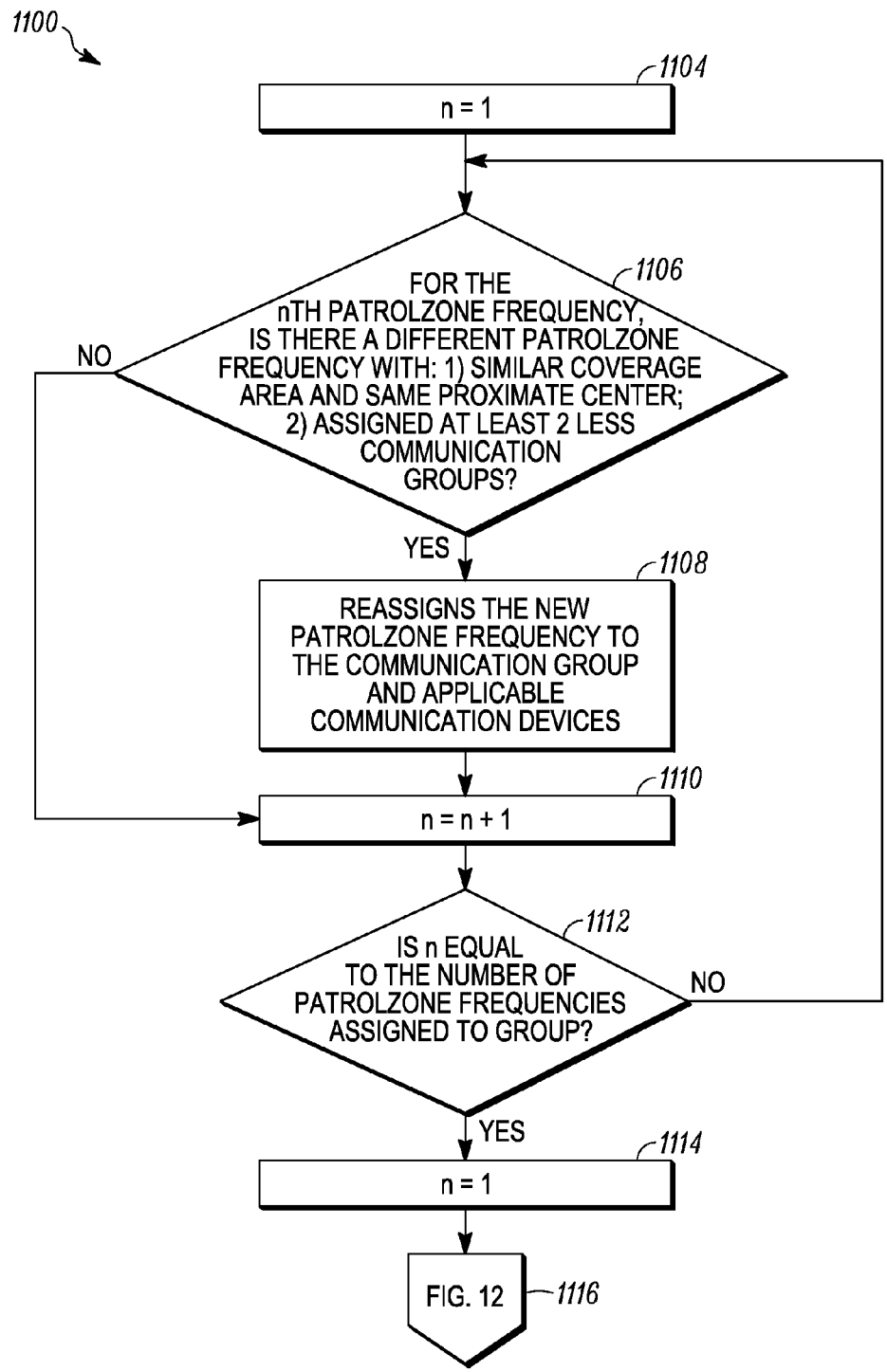
FIG. 11 is a logical flowchart illustrating a method in accordance with some embodiments.
Figure 12:
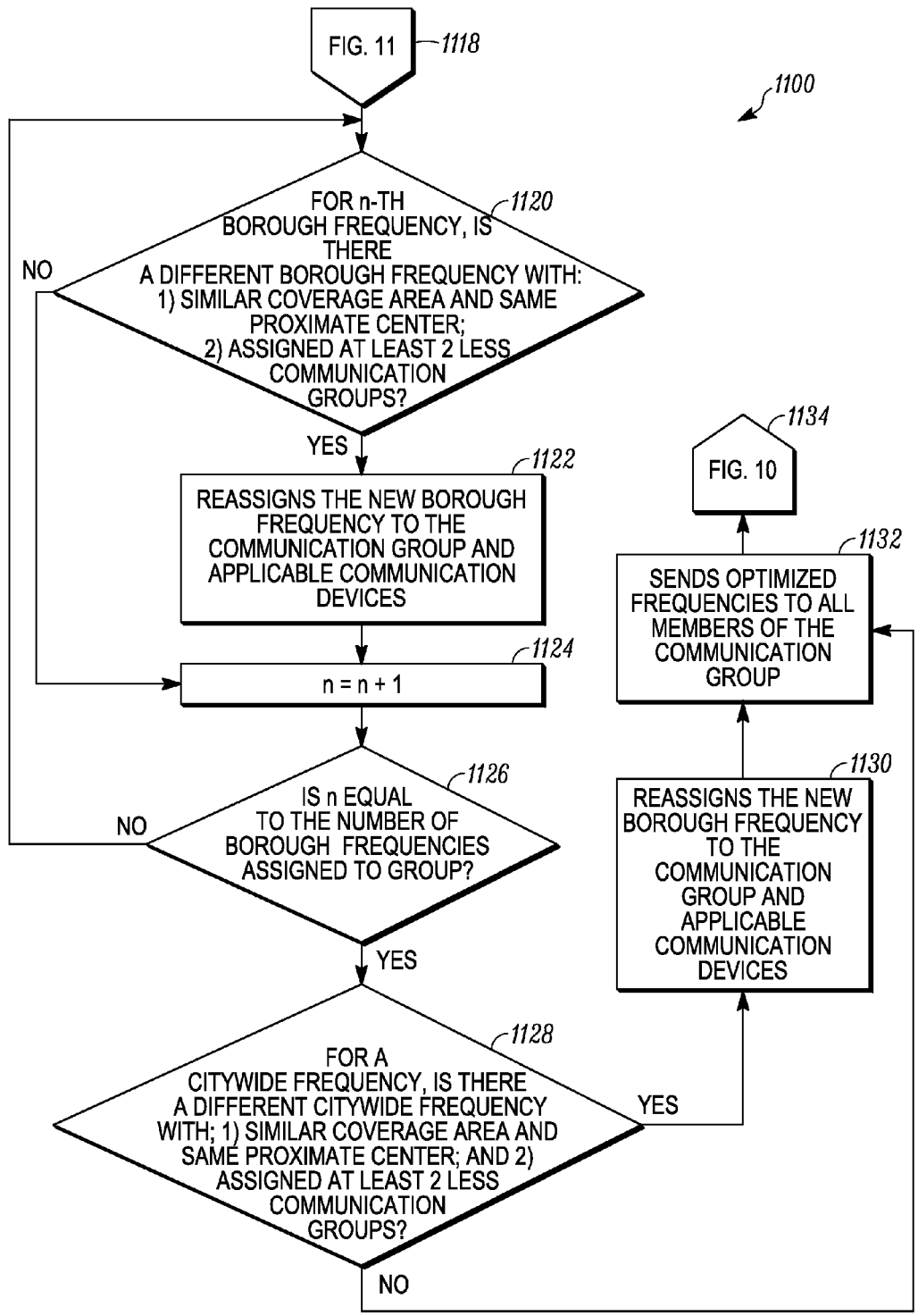
FIG. 12 is a logical flowchart illustrating a method in accordance with some embodiments.

Referring now to FIG. 11 and FIG. 12, a logical flowchart illustrating method 1100 for optimizing load on a frequency of a conventional analog wireless network in accordance with some embodiments of the present disclosure is shown, wherein FIG. 12 is a continuation of FIG. 11. Method 1100 is a frequency load optimization process that is performed by an infrastructure device coupled to the LTE network, for example, in response to trigger events 808 and 816 of the state transition diagram 800 (FIG. 8) for the infrastructure device. Process 1100 enables as many communication devices as possible in a communication group to share the same patrolzone frequency, borough frequency, and citywide frequency.

Accordingly, as the communication devices move or on some periodic basis as the location of the communication devices in the network are updated and sent to the infrastructure device, the channels used for group communications can be load balanced. At 1104 of process 1100, the infrastructure device sets a loop counter, n, to a value of 1. At 1106, the infrastructure device starts frequency load optimization on the n-th patrolzone frequency. As used herein, n-th means an index of a patrolzone frequency. For example, a communication group includes ten communication devices that are assigned to six different patrolzone frequencies. The six different patrolzone frequencies are indexed from 1st to 6th for ease of reference herein.

Turning back to 1106, the infrastructure device determines whether there is a patrolzone frequency (herein referred to as patrolzone frequency X) that is different from the n-th patrolzone frequency of the communication group, has a similar coverage area as the n-th patrolzone frequency, has the same approximate center or coverage area as the n-th patrolzone frequency, and has been assigned at least two less communication groups. If such a patrolzone frequency X is found, the infrastructure device assigns the patrolzone frequency X to the communication group, and to each communication device of the communication group whose patrolzone frequency is currently the n-th patrolzone frequency, at 1108, and then, at 1110, increments the loop counter, n, by 1. Turning back to 1106, if the infrastructure device fails to find a patrolzone frequency meeting all the requirements, execution of method 1100 transitions directly to block 1110. At 1112, the infrastructure device determines whether all the patrolzone frequencies of the communication group have been checked for load optimization. If so, the infrastructure device resets the loop counter, n, to 1 at 1114. Otherwise, the infrastructure device tries to optimize the next patrolzone frequency at 1106. Frequency load optimization of method 1100 at 1116 is further illustrated by reference to FIG. 12.

Turning now to FIG. 12, at 1118, method 1100 continues from 1116 of FIG. 11. At 1120, the infrastructure device starts frequency load optimization on the n-th borough frequency by determining whether there is a borough frequency (herein referred to as borough frequency X) that is different from the n-th borough frequency, has a similar coverage area as the n-th borough frequency, has the same approximate (also referred to as "proximate") center (e.g., coverage area) as the n-th borough frequency, and has been assigned at least two less communication groups. If such a borough frequency X is found, the infrastructure device assigns the borough frequency X to the communication group, and to each communication device of the communication group whose borough frequency is currently the n-th borough frequency, at 1122. At 1124, the infrastructure device increments the loop counter, n, by 1. Turning back to 1120, if the infrastructure device fails to find a borough frequency meeting all the requirements, execution of method 1100 transitions directly to block 1124.

At 1126, the infrastructure device determines whether all the borough frequencies of the communication group have been checked for load optimization. If there are more borough frequencies for load optimization, the infrastructure device tries to optimize the next borough frequency at 1120. Otherwise, execution of method 1100 transitions to 1128, wherein the infrastructure device checks whether there is a citywide frequency (herein referred to as citywide frequency X) that is different from the current citywide frequency of the communication group, has a similar coverage area as the current citywide frequency, has the same proximate center as the current citywide frequency, and has been assigned at least two less communication groups. If such a citywide frequency X is found, the infrastructure device assigns the citywide frequency X to the communication group, and to each communication device of the communication group, at 1130. At 1132, the infrastructure device updates all communication devices of the communication group with the optimized sets of frequencies and then determines a priority frequency at 1134, which is further illustrated by reference to FIG. 10 described above in detail.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for coordinating wireless coverage between a first wireless network and a second wireless network for members of a communication group, wherein a communication protocol implemented by the second wireless network is different from a communication protocol implemented by the second wireless network, the method comprising:

an infrastructure device coupled to the first wireless network performing:

determining that a first communication device has joined as a first member of the communication group and is engaged in a group communication over the first wireless newtwork;

determining a first set of channels on the second wireless network for the communication group, wherein the first set of channels is determined based on the location of members of the communication group;

determining a first priority channel in the first set of channels;

sending the first set of channels including the first priority channel to the first communication device.

2. The method of claim 1, wherein the first priority channel is determined based on size of the coverage area of the channels in the first set.

3. The method of claim 2, wherein the first priority channel is a channel in the first set of channels having a smallest coverage area in which at least a majority of the members of the communication group are located.

4. The method of claim 1 further comprising the infrastructure device performing determining and sending to a second member of the communication group a second set of channels on the second wireless network for the communication group, wherein the second set of channels includes a second priority channel;

changing the second priority channel to the first priority channel based at least on the locations of the first communication device and the second member of the communication group;

sending the first priority channel to the second communication device.

5. The method of claim 1, wherein a first channel in the first set of channels is the same channel as is included in a second set of channels for a second member of the communication group, based on the location of the first communication device and the location of a second member of the communication group.

6. The method of claim 1, wherein a first channel in the first set of channels has a coverage area wherein the only member of the communication group that is located in the coverage area is the first communication device, wherein the first channel is a least loaded channel in the second wireless network having the same coverage area as the first channel and that includes the first communication device in its coverage area.

7. The method of claim 1 further comprising the infrastructure device performing detecting a trigger event;

performing a channel load optimization process that results in a change of a channel included in a current set of channels on the second wireless network for at least one member in the communication group;

generating an updated set of channels for the at least one member in the communication group based on the change of the channel;

communicating the updated set of channels to the at least one member in the communication group.

8. The method of claim 7, wherein the trigger event comprises at least one of:
- a change in membership of the communication group or of another communication group;
- a change in location of a member of the communication group or of a member of another communication group.

9. The method of claim 1 further comprising:
- determining that at least a member of the communication group is only within coverage of the second wireless network;
- notifying the other members of the communication group to transition from the first wireless network to the second wireless network for communications for the communication group.

10. The method of claim 9 further comprising:
- determining that at least a majority of the members of the communication group are within the coverage of the first wireless network;
- notifying the members of the communication group to transition back to the first wireless network for the communications for the communication group.

11. The method of claim 1 further comprising:
- determining that a second communication device has left the communication group;
- updating the set of channels based on the location of the remaining members of the communication group;
- sending the updated set of channels to at least the first communication device.

12. The method of claim 11 further comprising:
- determining an updated priority channel in the updated set of channels;
- sending the updated priority channel to at least the first communication device.

* * * * *

UNITED STATES PATENT AND TRADEMARK OFFICE
CERTIFICATE OF CORRECTION

| | | |
|---|---|---|
| PATENT NO. | : 8,977,310 B2 | Page 1 of 1 |
| APPLICATION NO. | : 12/982485 | |
| DATED | : March 10, 2015 | |
| INVENTOR(S) | : Robert D. Logalbo et al. | |

It is certified that error appears in the above-identified patent and that said Letters Patent is hereby corrected as shown below:

IN THE SPECIFICATION:

In Column 8, Line 39, delete "GCC C" and insert -- GCCC --, therefor.

In Column 11, Line 63, delete "a LTE" and insert -- an LTE --, therefor.

In Column 14, Line 24, delete "a LTE" and insert -- an LTE --, therefor.

In Column 16, Line 4, delete "FIG." and insert -- FIGS. --, therefor.

IN THE CLAIMS:

In Claim 1, Column 20, Line 7, delete "second" and insert -- first --, therefor.

In Claim 1, Column 20, Line 14, delete "newtwork;" and insert -- network; --, therefor.

In Claim 4, Column 20, Line 31, delete "performing" and insert -- performing: --, therefor.

In Claim 7, Column 20, Line 57, delete "performing" and insert -- performing: --, therefor.

Signed and Sealed this
Twenty-eighth Day of June, 2016

Michelle K. Lee
*Director of the United States Patent and Trademark Office*